(12) United States Patent
Bishop et al.

(10) Patent No.: US 10,371,163 B2
(45) Date of Patent: Aug. 6, 2019

(54) LOAD ABSORPTION SYSTEMS AND METHODS

(71) Applicant: General Electric Company, Schenectady, NY (US)

(72) Inventors: Michael Jason Bishop, Mason, OH (US); Rajendra Madhukar Kelkar, Mason, OH (US); Alex Yuen, Mason, OH (US); Andrew Philip Woodfield, Maineville, OH (US)

(73) Assignee: General Electric Company, Shenectady, NY (US)

( * ) Notice: Subject to any disclaimer, the term of this patent is extended or adjusted under 35 U.S.C. 154(b) by 475 days.

(21) Appl. No.: 15/013,099

(22) Filed: Feb. 2, 2016

(65) Prior Publication Data

US 2017/0218973 A1 Aug. 3, 2017

(51) Int. Cl.
*F04D 29/34* (2006.01)
*F02K 3/06* (2006.01)
(Continued)

(52) U.S. Cl.
CPC ............ *F04D 29/34* (2013.01); *B22F 3/1055* (2013.01); *B22F 5/009* (2013.01); *B33Y 80/00* (2014.12);
(Continued)

(58) Field of Classification Search
CPC ...... F01D 5/3015; F01D 5/3023; F01D 5/303; F01D 5/3038; F01D 5/3053; F01D 5/323;
(Continued)

(56) References Cited

U.S. PATENT DOCUMENTS 3,801,222 A 4/1974 Violette
4,405,285 A * 9/1983 Surdi ...................... F01D 5/326
411/107
(Continued)

FOREIGN PATENT DOCUMENTS

DE 28 36 978 A1 3/1980
EP 2 853 691 A1 4/2015

OTHER PUBLICATIONS

Extended European Search Report and Opinion issued in connection with corresponding EP Application No. 17153922.4 dated Dec. 14, 2017.
(Continued)

*Primary Examiner* — Carlos A Rivera
*Assistant Examiner* — Sang K Kim
(74) *Attorney, Agent, or Firm* — General Electric Company; Pamela Kachur (57) ABSTRACT

A load absorbing system that may include a rotor blade retention system is provided. The load absorbing system may include a block, a first retainer plate, and a deformable core. The block may be selectively positioned alongside a dovetail groove. The block may have a first face directed away from the blade root and an axially-spaced second face directed toward the blade root. The first retainer plate may be attached to the second face of the block and axially positioned between the block and the axially-directed surface of the blade root. The deformable core may be positioned between the block and the first retainer plate.

15 Claims, 7 Drawing Sheets

(51) Int. Cl.
*F04D 29/32* (2006.01)
*F01D 5/32* (2006.01)
*F01D 5/30* (2006.01)
*B22F 3/105* (2006.01)
*B22F 5/00* (2006.01)
*B33Y 80/00* (2015.01)
*B22F 3/04* (2006.01)
*B22F 3/15* (2006.01)
*B22F 3/22* (2006.01)

(52) U.S. Cl.
CPC ......... *F01D 5/3007* (2013.01); *F01D 5/3015* (2013.01); *F01D 5/32* (2013.01); *F01D 5/323* (2013.01); *F01D 5/326* (2013.01); *F02K 3/06* (2013.01); *F04D 29/322* (2013.01); *F04D 29/329* (2013.01); *B22F 3/04* (2013.01); *B22F 3/15* (2013.01); *B22F 3/225* (2013.01); *F05D 2220/323* (2013.01); *F05D 2220/36* (2013.01); *F05D 2230/31* (2013.01); *F05D 2250/283* (2013.01); *F05D 2260/30* (2013.01); *F05D 2300/133* (2013.01); *Y02P 10/295* (2015.11); *Y02T 50/671* (2013.01); *Y02T 50/673* (2013.01)

(58) Field of Classification Search
CPC . F01D 5/326; F02K 3/06; F04D 29/34; F04D 29/322; F04D 29/329; F05D 2220/323; F05D 2220/36; F05D 2250/283; F05D 2260/30; F05D 2300/133
See application file for complete search history.

(56) References Cited

U.S. PATENT DOCUMENTS

| | | | | |
|---|---|---|---|---|
| 4,502,841 | A | * | 3/1985 | Kebedjis ................. F01D 5/326 416/220 R |
| 5,022,824 | A | * | 6/1991 | Violette ................. B64C 11/008 416/230 |
| 5,259,728 | A | * | 11/1993 | Szpunar ................. F01D 5/3007 416/2 |
| 5,522,702 | A | | 6/1996 | Kemsley et al. |
| 6,439,851 | B1 | | 8/2002 | Wong |
| 6,457,942 | B1 | | 10/2002 | Forrester |
| 8,061,994 | B2 | | 11/2011 | Pansy et al. |
| 8,434,663 | B2 | | 5/2013 | Meier |
| 9,376,926 | B2 | | 6/2016 | Anderson et al. |
| 9,441,494 | B2 | | 9/2016 | Marlin et al. |
| 2013/0195671 | A1 | | 8/2013 | El-Wardany et al. |
| 2014/0072437 | A1 | * | 3/2014 | Marlin ................. F01D 5/323 416/220 R |
| 2014/0163445 | A1 | | 6/2014 | Pallari et al. |
| 2015/0345396 | A1 | | 12/2015 | Zelesky et al. |
| 2016/0230579 | A1 | | 8/2016 | Schwartz et al. |
| 2016/0237836 | A1 | * | 8/2016 | Harris ................. F01D 25/12 |
| 2017/0037738 | A1 | | 2/2017 | Marin |

OTHER PUBLICATIONS

Office Action issued in connection with corresponding CA Application No. 2955436 dated Jan. 17, 2018.

Machine Translation and First Office Action and Search issued in connection with corresponding CN Application No. 201710055908.6 dated Jul. 2, 2018.

* cited by examiner

LOAD ABSORPTION SYSTEMS AND METHODS

FIELD OF THE INVENTION

The present subject matter relates generally to systems for absorbing impact loads, and more specifically to systems for absorbing impact loads within an aircraft engine.

BACKGROUND OF THE INVENTION

Managing the high-impact load forces is a concern across a number of industries and applications. For instance, absorption of high-impact loads may be particularly applicable in aerospace, industrial power-generation, marine, or other aero-derivative industries, and other industries such as automotive and defense. In the context of aircrafts, it may be useful to plan for one or more element to suffer a high load or impact during flight. Certain elements of the aircraft may be especially susceptible to elevated load conditions that risk damaging the overall aircraft and performance. Accordingly, it may be advantageous to provide an energy-absorbing configuration for these elements.

Within an aircraft, it may be especially useful to minimize damage on or around an engine during flight. Gas turbine engines, such as turbofan gas turbine engine, are often used for powering an aircraft in flight. Some gas turbine engines includes a fan assembly having a plurality of circumferentially spaced apart fan blades, each having a blade root disposed in a complementary, axially extending groove in the perimeter of a rotor disk. As the aircraft is powered during flight, leading portions of the turbofan engine, such as the blades, a casing enclosing the blades or core engine, and/or other propulsive members may encounter extreme loads that are outside the range of loads carried during normal operating conditions.

In the context of fan blades, the normal axial loads carried to the rotor disk by the blade roots are relatively small. During normal operations, these loads include primarily the aerodynamic thrust loads developed by the fan blades, and vibratory loads thereof. However, during operation the engine may be subject to extreme loading conditions. For instance, a blade might strike a bird that is ingested into the engine, or a blade-out occurrence may arise wherein one of the fan blades is severed from the rotor disk. These extreme conditions may generate relatively large axial forces upon impact with adjacent blades. During such conditions, the bird or severed blade is accelerated in the downstream direction by impact with the adjacent blades, which imposes a relatively large force in the axial upstream direction.

In order to accommodate such large axial forces, many conventional systems rely on solid or multi-piece members. For example, in the context of fan blades, solid retainers or retention brackets positioned in front of and/or behind the axial blade root within the axially extending groove. These conventional systems may add significant cost and/or weight to the overall engine. Moreover, during normal use, the additions of weight may negatively impact engine efficiency and performance.

Accordingly, further improvements are desired to increase system performance while reducing cost and weight.

BRIEF DESCRIPTION OF THE INVENTION

Aspects and advantages of the invention will be set forth in part in the following description, or may be obvious from the description, or may be learned through practice of the invention.

In accordance with one aspect of the present disclosure, a rotor blade retention system is provided. The rotor blade retention system may include a block, a first retainer plate, and a deformable core. The block may be selectively positioned alongside a dovetail groove. The block may have a first face directed away from the blade root and an axially-spaced second face directed toward the blade root. The first retainer plate may be attached to the second face of the block and axially positioned between the block and the axially-directed surface of the blade root. The deformable core may be positioned between the block and the first retainer plate.

In accordance with another aspect of the present disclosure, a load absorbing system is provided. The load absorbing system may include a first component, a second component, and a deformable core. The deformable core may be positioned between the first component and the second component. The deformable core may include one or more webbing wave members alternating uninterrupted between a top radial portion and a bottom radial portion of the deformable core.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. "Substantially," "about," and "generally," as used herein, are all relative terms indicating as close to the desired value as can reasonably be achieved within conventional manufacturing tolerances.

The terms "upstream" and "downstream" refer to the relative direction with respect to fluid flow in a fluid pathway. For example, "upstream" refers to the direction from which the fluid flows, and "downstream" refers to the direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component.

Figure 1:
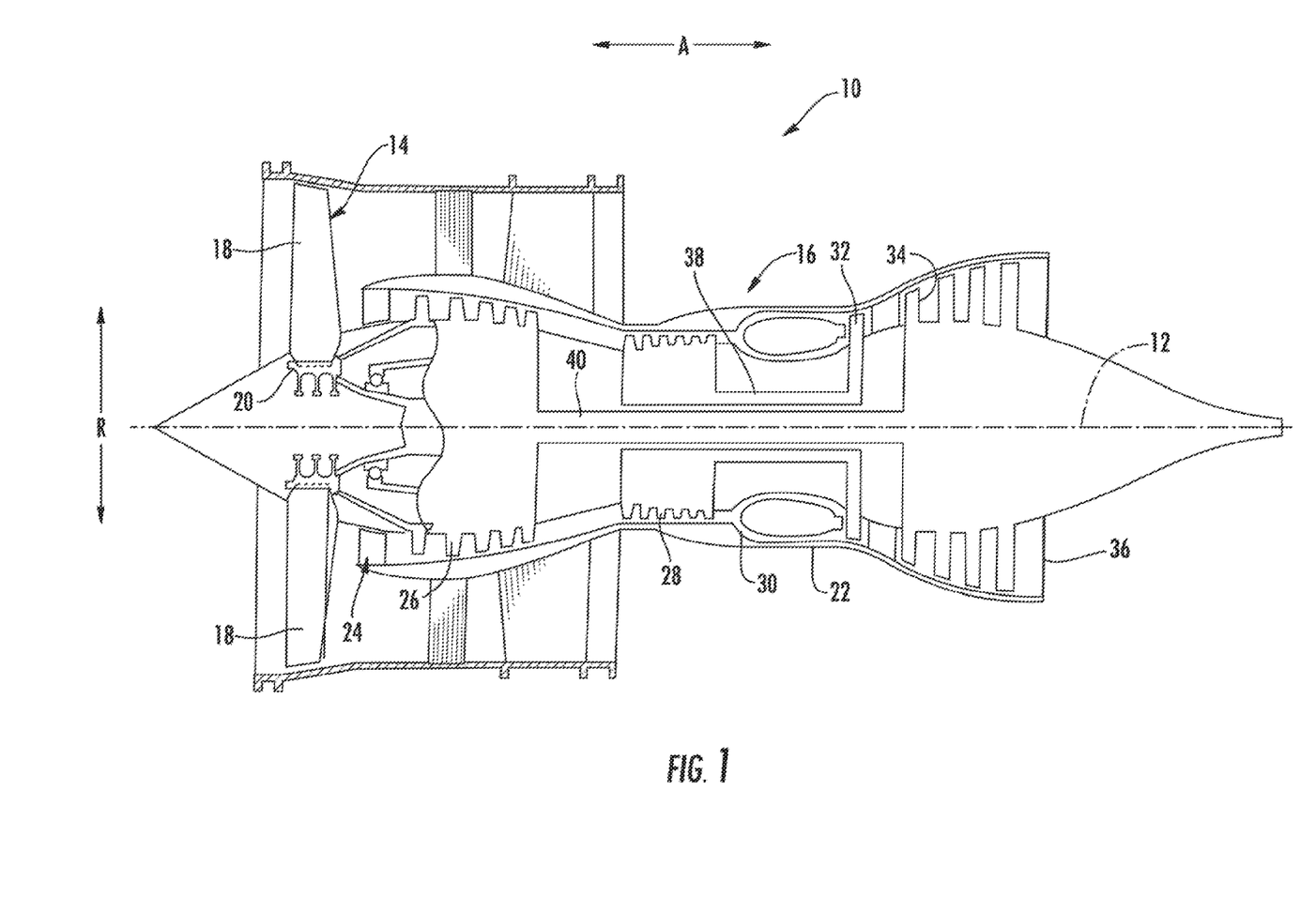
FIG. 1 provides a schematic cross-sectional view of a gas turbine engine in accordance with one embodiment of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R (extending radially from and orthogonal to the central axis 12). In general, the turbofan 10 includes a fan section 14 and a core turbine engine 16 disposed downstream from the fan section 14. As shown, the fan section includes a plurality of blades 18 extending in the radial direction R from a rotor disk 20.

The exemplary core turbine engine 16 depicted generally includes a substantially tubular outer casing 22 that defines an annular inlet 24. The outer casing 22 encases, in serial flow relationship, a compressor section including a booster or low pressure (LP) compressor 26 and a high pressure (HP) compressor 28; a combustion section 30; a turbine section including a high pressure (HP) turbine 32 and a low pressure (LP) turbine 34; and a jet exhaust nozzle section 36. A high pressure (HP) shaft or spool 38 drivingly connects the HP turbine 32 to the HP compressor 28. A low pressure (LP) shaft or spool 40 drivingly connects the LP turbine 34 to the LP compressor 26. Although a turbofan embodiment is illustrated, it is anticipated that the present disclosure can be equally applicable to other turbine-powered engines or rotary machines including a shaft, such as an open rotor engine, a turboshaft engine, a turbofan engine configuration, or other rotary machine.

Figure 2:
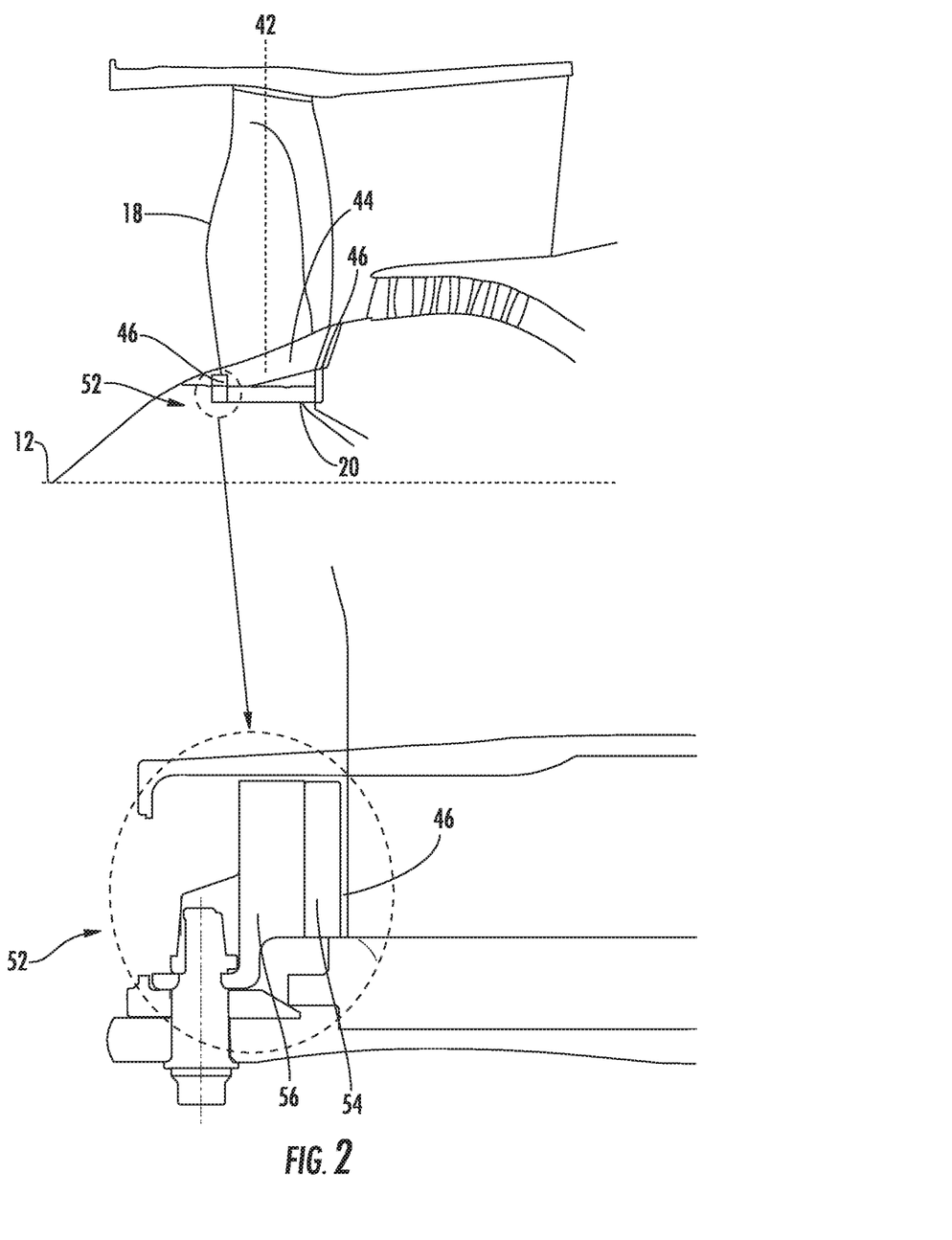
FIG. 2 provides a partial schematic cross-sectional view of a gas turbine engine, including a magnified view of a blade retention system in accordance with one embodiment of the present disclosure.
Figure 3:
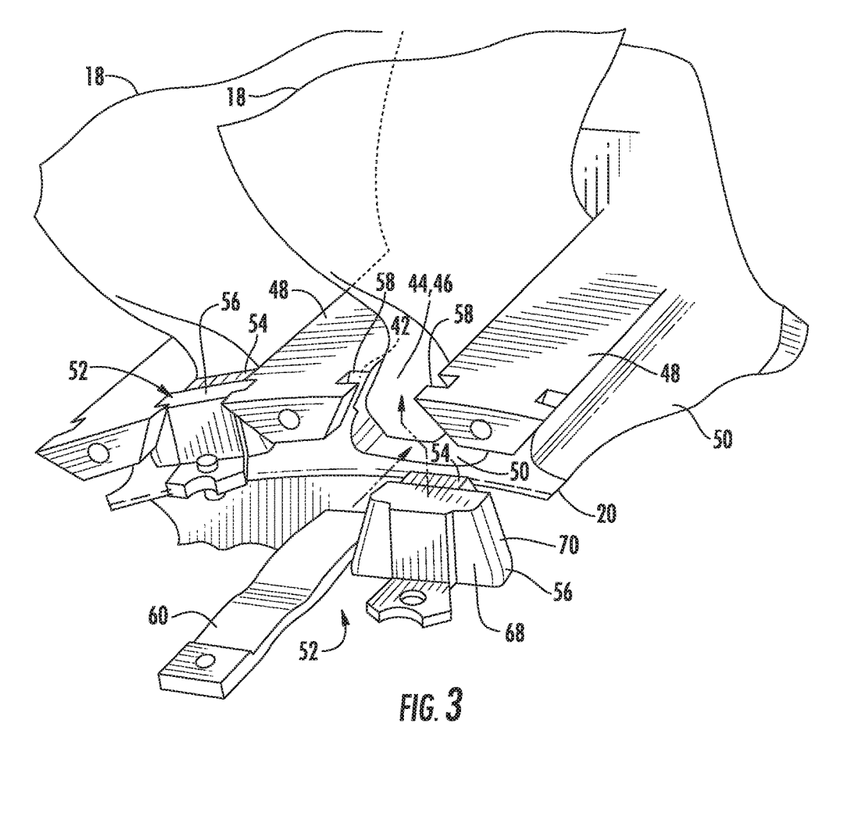
FIG. 3 provides a partially-exploded perspective view of a blade retention system within a gas turbine engine in accordance with one embodiment of the present disclosure.

Turning to FIGS. 2 and 3, a magnified view of the fan section 14 (see FIG. 1) is illustrated, including a blade retention system 52 or retainer axially engaged with a blade root 44 of a discrete blade 18. Although the blade retention system 52 is provided as an exemplary embodiment of the present disclosure, it is understood that certain aspects of the disclosure may be applicable to other load absorbing configurations. As shown, a blade root 44 is positioned at a radially inward position along the radial axis 42 of each blade 18. When mounted, the blade root 44 is engaged with the rotor disk 20. Generally, each blade root 44 extends between two or more oppositely-disposed axially-directed surfaces 46. Moreover, the blade retention system 52 may engage the blade root 44 at one or both of these axially-directed surfaces 46.

As shown in FIG. 3, in some embodiments, a rotor disk 20 is provided with a plurality of circumferentially spaced apart dovetail posts 48 with respective pairs of circumferentially adjacent posts 48. An axially-extending dovetail groove 50 is defined between each pair of circumferentially adjacent posts 48. The blade roots 44 of certain embodiments are configured as complementary to the dovetail grooves 50. When assembled, each blade root 44 may be positioned within and through a discrete dovetail groove 50. During use, centrifugal force generated by the rotating blades 18 is carried through the blade roots 44 and into the posts of the rotor disk 20 for radially retaining the blade 18 thereto.

As shown, some embodiments of the blade retention system 52 are selectively fitted at least partially alongside and/or within the dovetail grooves 50. Moreover, each blade retention system 52 is configured to engage an axially-directed surface 46 of the blade roots 44. For instance, in some embodiments, a blade retention system 52, including a deformable core 54 and an attached block 56, may be fitted between each pair of adjacent dovetail posts 48. In additional or alternative embodiments, the block 56 and deformable core 54 may be inserted into a pair of retention slots 58. As shown in FIG. 3, the retention slots 58 are defined by the dovetail posts 48 at the axial ends of each dovetail groove 50. In some such embodiments, each blade retention system 52 may be selectively inserted radially upward into a pair of adjacent complementary retention slots 58 to prevent a corresponding blade root 44 from inadvertently moving outside of the dovetail groove 50 in the axial direction A.

Optionally, a spacer 60 is attached to the rotor disk 20 and block 56 (e.g., via one or more bolts or other mechanical connectors). As shown in FIG. 3, each of the spacers 60 may be inserted during assembly axially into a respective dovetail groove 50 between the blade root 44 and the rotor disk 20 and bolted to the block 56 that is disposed in the retention slots 58.

Figure 4:
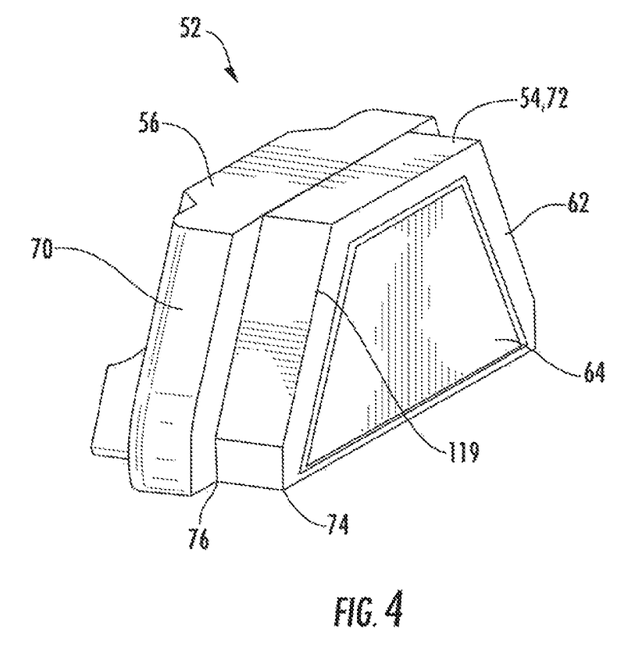
FIG. 4 provides a perspective view of an exemplary embodiment block, deformable core, and retainer plate in accordance with one embodiment of the present disclosure.

As illustrated in FIG. 4, some embodiments of the blade retention system 52 include a rigid block 56 attached to a deformable core 54 and one or more retainer plates 62. When assembled, the deformable core 54 of the illustrated embodiment is fixed between the rigid block 56 and retainer plate 62. A low-friction rub pad 64, such as a solid polytetrafluoroethylene (PTFE) sheet, may be included. In optional embodiments, the rub pad 64 is fixed to the retainer plate 62 to contact the blade root 44 at an axial extreme of the blade retention system 52 (see FIGS. 2 and 3).

Figure 5:
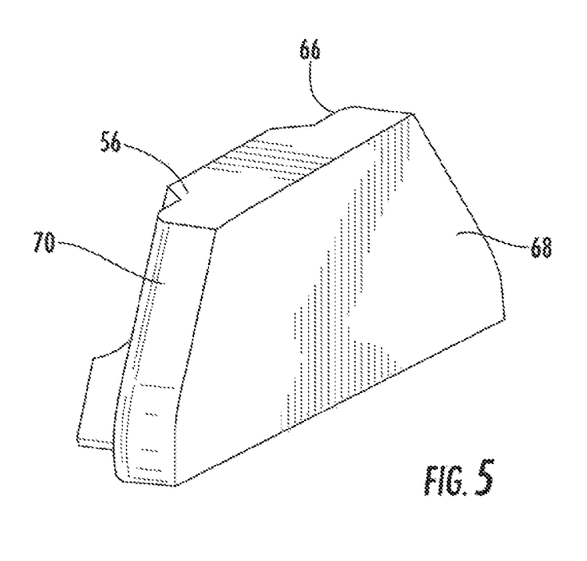
FIG. 5 provides a perspective view of the exemplary embodiment block of FIG. 4.

As shown in FIG. 5, the block 56 includes oppositely-disposed axial faces 66, 68. When assembled, the first face 66 of the block 56 may be directed outwardly away from a blade root 44 while the second face 68 is directed inwardly toward the blade root 44 (see FIGS. 2 and 3). Lateral rails 70 extending between the first and the second face 66, 68 may be angled complementary to the retention slots 58.

The block 56 in some embodiments is a substantially solid member formed from one or more metal materials. For instance, in some embodiments, the block 56 is formed from a titanium material using methods such as machining from a plate, a billet or forging, or a casting. The titanium material may be embodied by pure titanium or one or more titanium alloys (e.g., Ti 6-4). Optional embodiments may be constructed from another suitable material or alloy, such as one or more aluminum alloys (e.g., RSA-501 or SCALMAL-LOY®). Additionally or alternatively, the block 56 may be formed from a net shape or near net shape process utilizing a powder material. For instance, the block 56 may be formed from a metal injection molding process (MIM) to include one or more MIM materials (e.g., powdered metal alloy). Moreover, the MIM material may be debound after an initial molding to be substantially free of any MIM binder. For instance, the MIM material may undergo a thermal debinding process, solvent debinding process (e.g., water debinding process), or both. Other embodiments of the block may be formed by an additional or alternative process, such as powder injection molding, press and sinter, cold isostatic pressing, hot isostatic pressing, pneumatic isostatic forging, or other molding and/or additive processes that may or may not utilize binders.

In some embodiments, retainer plate 62 and a deformable core 54 are attached to the second face 68 of the block 56, as shown in FIG. 4. In the illustrated embodiments, each of the retainer plate 62 and the deformable core 54 are substantially parallel to the second face 68. Each of the retainer plate 62 and the deformable core 54 may be axially positioned between the block 56 and an axially-directed surface 46 of the blade root 44. The retainer plate 62 of some embodiments is configured to engage the axially-directed surface 46 of the blade root 44, either through direct axial contact or axial contact through the rub pad 64 (see FIGS. 2 and 3). One or both of the deformable core 54 and retainer plate 62 may be formed from a titanium material. The titanium material may be embodied by pure titanium or one or more titanium alloys (e.g., Ti 6-4). In additional or alternative embodiments, one or more other suitable alloys, such as aluminum alloys (e.g., RSA-501 or SCALMAL-LOY®), may be included to form the deformable core 54 and/or retainer plate 62.

In some embodiments, the deformable core 54 and one or more retainer plates 62 are not formed as discrete members, but as integrally bonded elements. For instance, the deformable core 54 and retainer plate(s) 62 of certain embodiments is formed together from a net shape or near net shape process. In an exemplary embodiment, the deformable core 54 and retainer plate 62 may be formed from a metal injection molding process to include a metal injection molding material (e.g., powdered metal alloy). In an additional or alternative exemplary embodiment, the deformable core 54 and retainer plate 62 are formed from an additive manufacturing process that is formed from success synthesized layers. Thus, an additively-manufactured bond may be formed as an attachment between one or more segments. For instance, one exemplary embodiment may be formed from direct metal laser sintering, i.e., direct metal laser melting (DMLM) process to generate a DMLM bond between the deformable core 54 and the retainer plate 62. Advantageously, such embodiments may permit lighter and more rigid structures to be generated, thus decreasing weight and improving engine performance.

Turning to FIGS. 6 through 11, the deformable core 54 of exemplary embodiments includes a webbing 72 fixed to the block 56. Generally, the webbing 72 extends axially between a proximal end 74 and a distal end 76 to absorb an impact force being transmitted to the block 56 from the blade root 44 (see FIG. 2). The webbing 72 includes a rigid body configured to substantially deform, thereby deflecting and absorbing a majority of the impact force and preventing damage to the rotor disk 20 and engine core 16. In some embodiments, the webbing 72 is formed as an integral member from a net shape or near net shape process (e.g., metal injection molding or direct metal laser melting, as discussed above). Optionally, the webbing 72 may be attached at one axial end to a first retainer plate 62A and at an opposite end to a second retainer plate 62B. Each retainer plate 62 may further include a unitary or multi-piece configuration attached to the webbing 72.

Optionally, the webbing 72 may also be attached to the second face 68 of the block 56 (see FIG. 5), either directly, or through the first retainer plate 62A. The attachment between the webbing 72 and the block 56 may be facilitated by an adhesive, a direct metal laser sinter bond (i.e., DMLM bond), a brazed joint, or a suitable mechanical attachment configuration. In some embodiments, the webbing 72 will be integrally bonded to the block 56 at the second face 68. In some embodiments wherein the webbing 72 attaches directly to the block 56, a single retainer plate, e.g., 62B, may be provided and integrally bonded to the second face 68 of the block 56.

Figure 6:
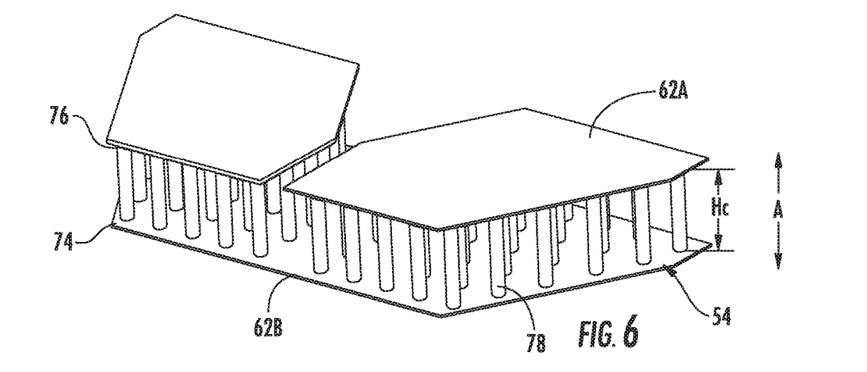
FIG. 6 provides a perspective view of an exemplary embodiment of a deformable core and retainer plate in accordance with one embodiment of the present disclosure.
Figure 7:
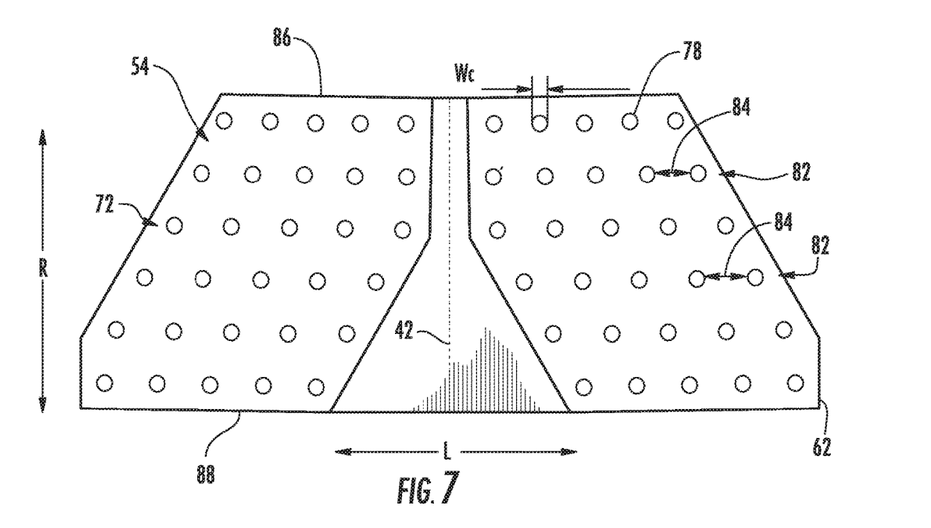
FIG. 7 provides an overhead view of the exemplary embodiment of FIG. 6.

As shown in FIGS. 6 and 7, some embodiments of the deformable core 54 include a webbing 72 that extends linearly between two or more axially spaced retainer plates 62A, 62B. Optional embodiments of the webbing 72 include a plurality of columns 78 that are longitudinally disposed parallel to the axial direction A. Each column 78 of the exemplary embodiments of FIGS. 6 and 7 includes an identical height (e.g., maximum height) $H_C$ that extends between the proximal end 74 and the distal end 76. In some embodiments, the webbing 72 is configured to have a constant axial profile and/or width. For instance, in an exemplary embodiment, each column 78 includes a circular axial profile that has a constant diameter or width $W_C$ between the proximal end 74 and the distal end 76. Additional or alternative column embodiments may include a non-circular (e.g., rectangular and/or square) axial profile.

Together, the plurality of columns 78 is configured in a predetermined pattern. In other words, each column 78 is positioned at one or more predetermined radial and/or lateral distances from each adjacent column 78. In an exemplary embodiment, this predetermined column 78 distance forms a grid pattern having a set number of parallel rows 82. Within each row 82, the columns 78 may be laterally aligned. In some embodiments, the lateral inter-row spacing 84 (i.e., the lateral distance between columns 78 sharing the same lateral row 82) will vary along the radial direction R. As shown in the exemplary embodiment of FIG. 7, the inter-row spacing 84 generally decreases in the radial direction R. As a result, the columns 78 in the row 82 nearest to the top radial portion 86 of the deformable core 54 will be spaced closer together than the columns 78 in the row 82 nearest to the bottom radial portion 88 of the deformable core 54. In other words, the columns 78 of some embodiments will generally fan out from the top radial portion 86 to the bottom radial portion 88. The columns 78 at the top radial portion will be more densely packed than those at the bottom radial portion. Alternative embodiments may include columns 78 that are spaced uniformly or according to another suitable pattern. For instance, the columns 78 may be provided in an alternate spacing pattern wherein, e.g., column spacing goes from an area of relatively high density to an area of relatively low density to another area of relatively high density.

Figure 8:
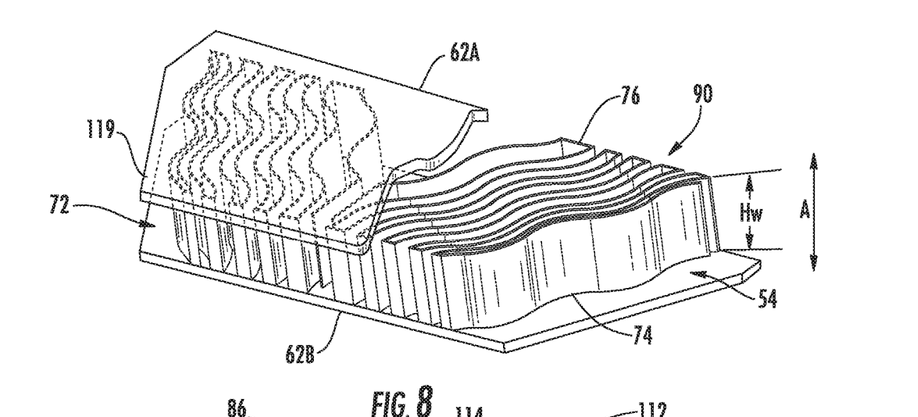
FIG. 8 provides a perspective view of an exemplary embodiment of a deformable core and retainer plate in accordance with one embodiment of the present disclosure.
Figure 9:
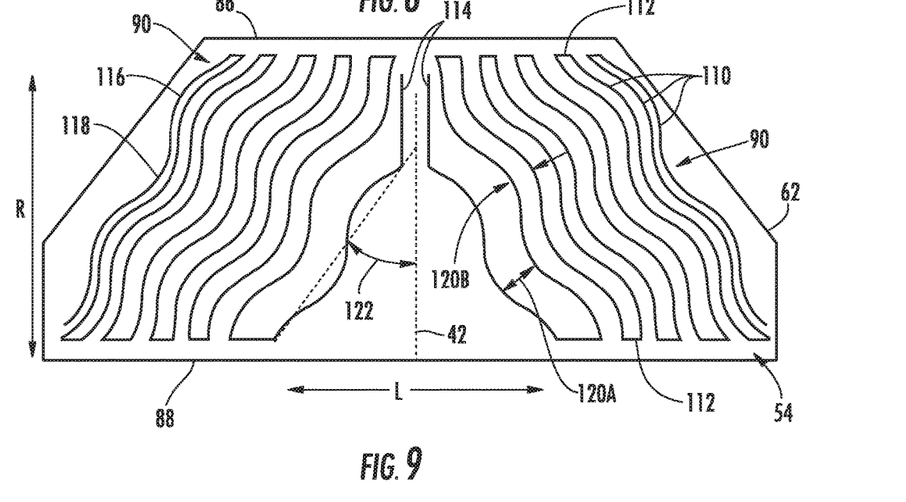
FIG. 9 provides an overhead view of the exemplary embodiment of FIG. 8.

Turning to FIGS. 8 and 9, optional embodiments of the deformable core webbing 72 include one or more uninterrupted wave members 90. Each wave member 90 has a height (e.g., maximum height) $H_W$ that extends linearly between the proximal end 74 and the distal end 76. In some embodiments, the height $H_W$ is constant across the wave member 90. In some embodiments, the height $H_W$ of each wave member 90 is identical and equal to the height $H_W$ of each other wave member 90. Moreover, each wave member 90 can be configured as a continuous strip. Thus, a wave member 90 is able to extend in a generally lateral direction while radially alternating between the top radial portion 86 of the deformable core 54 and the bottom radial portion 88 of the deformable core 54. The alternating segments of the wave member 90 thus provide distinct walls 110. Joinder edges 112 extend between adjacent walls 110 at the top radial portion 86 or the bottom radial portion 88. In optional embodiments, the each joinder edge 112 is disposed parallel the other joinder edges 112. In certain embodiments, a linear originating segment 114 is provided at a laterally inward portion of the wave member 90. As shown, some embodiments of the originating segment 114 are disposed parallel to the radial axis 42.

In some embodiments, each distinct wall 110 is formed as a louvered body, dispersing wall support across a greater axial surface area. As a louvered body, each wall 110 includes one or more distinct louver crests and valleys 116, 118. Adjacent walls 110 are positioned sequentially to define a predetermined wall spacing 120 therebetween. As shown, in some embodiments the predetermined wall spacing 120 is closed by the joinder edge 112 at the alternate end (i.e., the end at which the wave member 90 is redirected). However, in the embodiment of FIGS. 8 and 9, the non-alternating end of the wall spacing 120 is open in a radial direction R. In embodiments wherein the webbing 72 is formed by a powder-based net shape process (e.g., direct metal laser melting), excess powder may readily escape from the open non-alternating end of the deformable core 54.

In the exemplary embodiment of FIG. 9, the walls 110 are positioned in parallel, thus defining a wall spacing 120 that is constant between adjacent walls 110. Optionally, the walls 110 may be angled relative to the radial axis 42. In some embodiments, the general angle 122 of each wall 110 (e.g., the angle formed between the radial axis 42 and an average of sequential louver crests and valleys 116, 118) is between about 0° and about 60°. In further embodiments, the general angle 122 is between about 20° and about 45°. In optional embodiments, the walls 110 extend at a general angle 122 that is parallel to a plate rim 119 (i.e., outer edge) of a retainer plate 62 and/or parallel to a lateral rail 70 of the block 56 (see FIG. 4).

In additional or alternative embodiments, the wall spacing 120 is configured to vary in a generally lateral direction L. For instance, in an example embodiment, the webbing 72 includes two uninterrupted wave member 90 mirrored across a segmented axis that divides the deformable core 54 into substantially equal halves. In the illustrated embodiment, the wall spacing 120 is configured to generally decrease with each successive pair of adjacent walls 110. In other words, a first wall spacing 120A between one pair of adjacent walls 110 will be greater than a second wall spacing 120B between another pair of adjacent walls 110 that is positioned laterally-outward from the first pair. Thus, the wall spacing 120 decreases in a substantially sequential manner outwardly in the lateral direction L. Each decrease in spacing may be uniform such that each wall spacing 120 decreases at a substantially identical rate (i.e., the amount of space between each adjacent wall decreases at a set sequential rate). Alternatively, the rate of decrease between adjacent pairs of wall may be varied, while still substantially decreasing in the lateral direction L. Advantageously, the described webbing 72 embodiments may provide increased support and rigidity, while reducing weight and providing improved engine performance.

Although the embodiments of FIGS. 8 and 9 illustrate wall spacing 120 that is configured to vary in a generally lateral direction L, alternative embodiments may be provided. For example, some additional or alternative embodiments of the wave member may include walls that are spaced either to be uniformly parallel, to increase in the generally lateral direction, or according to another suitable pattern.

Figure 10:
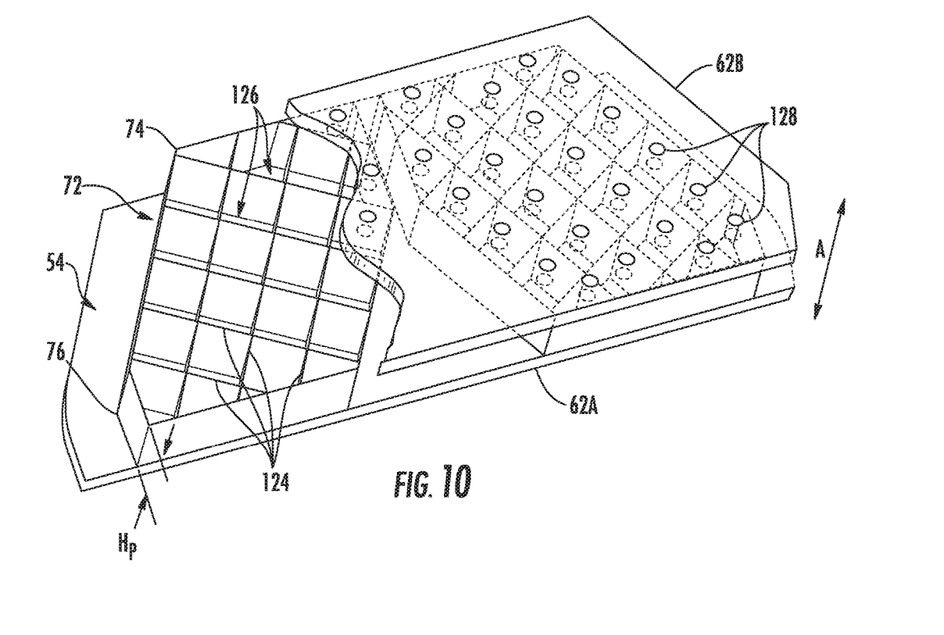
FIG. 10 provides a perspective view of an exemplary embodiment of a deformable core and retainer plate in accordance with one embodiment of the present disclosure.
Figure 11:
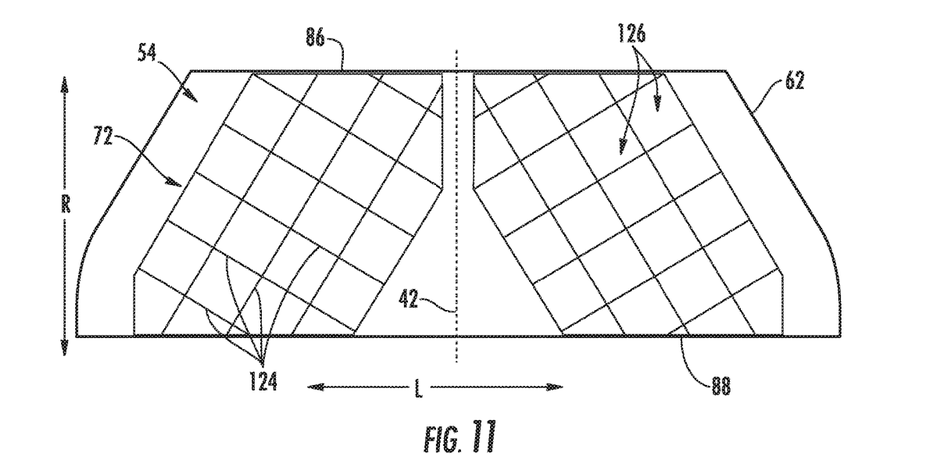
FIG. 11 provides an overhead view of the exemplary embodiment of FIG. 10.

As shown in FIGS. 10 and 11, further embodiments of the deformable core 54 have a webbing 72 that includes multiple intersected partitions 124. As shown, each intersected partition 124 has a height (e.g., maximum height) $H_P$ that extends linearly between the proximal end 74 and the distal end 76. In the exemplary embodiment of FIGS. 10 and 11, the height $H_P$ of each partition 124 is identical and equal to the height $H_P$ of each other partition 124. The partitions 124 extend in the radial and/or lateral directions R, L in a predetermined pattern to define a plurality of hollow cells 126. In an exemplary embodiment, each cell 126 is enclosed in the radial direction R and lateral direction L by adjacent partitions 124. On the proximal and distal ends 74, 76, the cells 126 may be substantially covered by the retainer plate(s) 62 and/or block 56. Although the intersected partitions 124 are illustrated in a grid pattern wherein each cell 126 has a rectangular cross sectional area, other suitable configurations, such as a honeycomb, may be provided.

In some embodiments, a retainer plate 62 is disposed over the deformable core 54. In embodiments wherein the deformable core 54 has a plurality of hollow cells 126, discrete apertures 128 may be provided over each hollow cell 126. For instance, in the exemplary embodiment of FIG. 10, the retainer plate 62 disposed over the deformable core 54 defines a plurality of powder apertures 128. Each powder aperture 128 extends in the axial direction A through the retainer plate portion above each hollow cell 126. In embodiments wherein the webbing 72 is formed by a powder-based net shape process (e.g., direct metal laser melting), excess powder may readily escape the hollow cells 126 through the axial powder apertures 128.

As noted above, certain aspects of the present disclosure may be readily applied to other energy or load absorbing members. For instance, one or more portion of a gas turbine engine fan casing, nose cone or spinner, outer casing, or nacelle may include a deformable block, including a webbing that is configured as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade retention system for restraining movement of a blade root along an axial direction, the blade root having an axially-directed surface, the rotor blade retention system comprising:
   a block selectively positioned alongside a dovetail groove, the block having a first face directed away from the blade root and an axially-spaced second face directed toward the blade root;
   a first retainer plate attached to the second face of the block and axially positioned between the block and the axially-directed surface of the blade root;
   a second retainer plate positioned for engagement with an axially-directed surface of the blade root;
   a deformable core positioned between the first retainer plate and the second retainer plate, the deformable core extending in the axial direction between a proximal end and a distal end, the deformable core being attached to the first and second retainer plates; and
   wherein at least one of the first retainer plate or the second retainer plate defines an axial powder aperture for releasing an excess formation of powder.

2. The rotor blade retention system of claim 1, wherein the deformable core includes a webbing fixed between the block and the axially-directed surface of the blade root.

3. The rotor blade retention system of claim 2, wherein the deformable core is integrally bonded to the first retainer plate.

4. The rotor blade retention system of claim 2, wherein the webbing includes a plurality of axially-extending rigid columns, a plurality of intersected partitions, or combinations thereof.

5. The rotor blade retention system of claim 2, wherein the webbing includes one or more wave members alternating between a top radial portion and a bottom radial portion of the deformable core.

6. The rotor blade retention system of claim 5, wherein each wave member includes a plurality of successive pairs of adjacent louvered walls, each pair of adjacent louvered walls defining a discrete wall spacing therebetween, wherein the wall spacings between the successive pairs decrease in a lateral direction.

7. The rotor blade retention system of claim 1, wherein at least one of the block, the first retainer plate, or the deformable core includes a titanium material.

8. The rotor blade retention system of claim 1, wherein the at least one of the block, the first retainer plate, or the deformable core includes a metal injection molding material.

9. The rotor blade retention system of claim 1, further comprising an additively-manufactured bond attaching the first retainer plate to the deformable core.

10. A rotor blade retention system for restraining movement of a blade root along an axial direction, the blade root having an axially-directed surface, the rotor blade retention system comprising:
    a block selectively positioned alongside a dovetail groove, the block having a first face directed away from the blade root and an axially-spaced second face directed toward the blade root;
    a first retainer plate connected to the second face of the block and axially positioned between the block and the axially-directed surface of the blade root;
    a deformable core positioned and secured between the block and the first retainer plate; and
    wherein the first retainer plate defines an axial powder aperture for releasing an excess formation of powder.

11. A rotor blade retention system for restraining movement of a blade root along an axial direction, the blade root having an axially-directed surface, the rotor blade retention system comprising:
    a block selectively positioned alongside a dovetail groove, the block having a first face directed away from the blade root and an axially-spaced second face directed toward the blade root;
    a first retainer plate axially positioned between the second face of the block and the axially-directed surface of the blade root; and
    a deformable core positioned and secured between the second face of the block and the first retainer plate, the deformable core including a plurality of columns longitudinally extending between the second face of the block and the first retainer plate, wherein the plurality of columns are configured in a grid pattern having a set number of parallel rows and laterally aligned columns such that each of the plurality of columns is positioned at one or more predetermined radial and/or lateral distances from an adjacent one of the plurality of columns, and wherein spacing between parallel rows decrease in a radial direction such that a top radial portion of the deformable core has smaller spacing than a bottom radial portion of the deformable core.

12. The rotor blade retention system of claim 11, further including a second retainer plate connected to the second face of the block, the deformable core being positioned and secured between the first retainer plate and the second retainer plate.

13. The rotor blade retention system of claim 11, wherein the deformable core is integrally bonded to the first retainer plate.

14. The rotor blade retention system of claim 12, wherein the deformable core is integrally bonded to the first retainer plate and the second retainer plate.

15. The rotor blade retention system of claim 11, wherein the deformable core is integrally bonded to the second face of the block at the distal end and attached to the first retainer plate at the proximal end.

* * * * *